United States Patent [19]
Feldman

[11] Patent Number: 5,864,818
[45] Date of Patent: Jan. 26, 1999

[54] AUTOMATED HOTEL RESERVATION PROCESSING METHOD AND SYSTEM

[76] Inventor: Ron Feldman, 606 Western Ave., Petaluma, Calif. 94952

[21] Appl. No.: 513,677

[22] Filed: Aug. 2, 1995

Related U.S. Application Data

[63] Continuation of Ser. No. 800,002, Jan. 4, 1993, abandoned.

[51] Int. Cl.[6] .................................................. G06F 153/02
[52] U.S. Cl. ....................................................... 705/5
[58] Field of Search .................... 395/205, 206; 705/5, 6, 35

[56] References Cited

U.S. PATENT DOCUMENTS

| | | | |
|---|---|---|---|
| 4,359,631 | 11/1982 | Lockwood et al. | 235/381 |
| 4,713,761 | 12/1987 | Shape et al. | 364/406 |
| 4,720,849 | 1/1988 | Tayama | 379/90 |
| 4,752,876 | 6/1988 | Couch et al. | 364/407 |
| 4,788,643 | 11/1988 | Trippe et al. | 395/206 |
| 4,918,722 | 4/1990 | Duehren | 379/100 |
| 4,922,439 | 5/1990 | Greenblatt | 364/407 |
| 5,068,888 | 11/1991 | Scherk | 379/100 |
| 5,084,770 | 1/1992 | Nakayama | 358/403 |
| 5,136,634 | 8/1992 | Rae | 379/100 |
| 5,146,348 | 9/1992 | Kaneyama | 358/407 |
| 5,187,787 | 2/1993 | Steen et al. | 395/600 |
| 5,237,499 | 8/1993 | Garback | 364/407 |
| 5,311,425 | 5/1994 | Inada | 395/206 |
| 5,404,291 | 4/1995 | Kerr et al. | 395/205 |

FOREIGN PATENT DOCUMENTS

| | | | |
|---|---|---|---|
| 1180916 | 9/1985 | U.S.S.R. | 364/407 |

OTHER PUBLICATIONS

"GE is to provide Network for major hotel reservations system", IDP Report, Feb. 3, 1989, p. 7.
"Integrated Hotel System to be unvieiled by NEC", New Release, Nov. 13, 1988, p. 1.
"Reservations service utilizes fax machines." (Thomas Cook Travel); The Business Journal—Phoenix May 21, 1990; vol : v10 Issue : n28 p. P19 B(1).
"New system for booking by computer", Hotel copy: New Computer Booking system confirm travel & room reserations in hotel. New York Times (National Edition) Nov. 12, 1988 p. 19.
Spiegelman, Lisa L.; "Hilton Hotels install micro–to–mainframe link"; Info World vol:v8 issue: n33, Page 17(1); Aug. 18, 1986.
Brown, Bob; "Hyatt chain cuts over new global reservation network". (Hyatt Hotels Corp.); Network World, vol.: v7 issue:n41 P.2(2), Oct. 8, 1990.
Bradley et al., "Travel Networking reservations"; Network World, Aug. 22, 1988.
Lisa L. Spiegelman, "Hilton Hotels Install Micro–to–Mainframe Link," *InfoWorld*, vol. 8, No. 33, Aug 18, 1986, p. 17.
Bob Brown, "Hyatt Chain Cuts Over New Global Reservation Network," *Network World*, vol. 7, No. 41, Oct 8, 1990, p. 2.
Trust II, Sales Literature "The Reservation Centers".
Lanyon North America, Sales Literature Lanyon–RATE Overview, Feb. 1992.

*Primary Examiner*—Meng-Ai T. An
*Assistant Examiner*—Xuong M. Chung-Trans

[57] ABSTRACT

A hotel reservation system receives hotel reservations from a travel agent or other authorized user and enters information relating to the traveler and the reservation into a hotel reservation terminal. The reservation information is transferred to transaction processor via a communications link, where the processor automatically generates transaction documents related to the traveler, the travel agent and the hotel accommodations. These transaction documents are then sequentially transmitted by the processor using a facsimile to various parties having an interest in the reservation transaction. A confirmation document is sent to the hotel for which the accommodations have been reserved. The banking institution through which the transaction has been financed is notified to pay the hotel and others, and the travel agent is also sent a confirming transaction document.

16 Claims, 4 Drawing Sheets

AUTOMATED HOTEL RESERVATION PROCESSING METHOD AND SYSTEM

RELATED APPLICATIONS

This is a continuation of application Ser. No. 08/000,028 filed on Jan. 4, 1993 now abandoned.

BACKGROUND OF THE INVENTION

1. Field of the Invention

This invention relates to automated transaction processing and more particularly to a computerized system and method for reserving hotel rooms using a computer to receive and process the hotel reservations from travel agents and users, and to sequentially generate and send different text facsimile confirmation letters and payment orders to the hotels, travel agents, banks, and other third parties, via their respective fax devices in an uninterrupted consolidated fashion.

2. Description of the Background Art

Despite the tremendous volume of travel related business which is conducted on a daily basis in the U.S. and throughout the world, the process of booking and administering hotel and travel reservations remains highly labor intensive for tour operators, wholesalers, and hotel reservation services. These companies are called "travel resellers", and make their profit by buying hotel rooms at a discount and marking up the price. On average, approximately 25 minutes is required to receive, book, and confirm each hotel reservation. Prior to the present invention, the travel reseller received the hotel reservation request from the traveler or his travel agent and subsequently prepared a confirmation document showing the reservation and retail price of the hotel room, a confirmation number, the name and address of the hotel, and various other information pertinent to the traveler's transaction. Separately, a document was prepared for transmittal to the hotel, confirming the reservation and usually stating the agreed upon retail price, as well as the price to be paid (or the commission to be received) by the travel agent. If a group stay was involved, a consolidated statement might be prepared, whereby a single document listed all of the travelers and their reservations.

As a separate manual step, the travel reseller prepared a bank deposit slip, either in the form of a credit card debit slip or a deposit record attached to the customer's check. This bank deposit was then mailed or delivered to the banking institution for payment. In the case of a franchise operation, a franchisee might then prepare a separate document to send to the franchiser along with franchise payments, if applicable. In cases where the travel reseller was offering a "package" including, for example, a shuttle transfer from the airport, the shuttle company might be separately notified of the reservation plans, using an additional manually generated document.

Presently, in the typical hotel reservation transaction for travel resellers, at least several different transaction forms must be prepared and transmitted to various parties. Conventional Personal Computer (PC) technology provides document facsimile capability directly from a user's computer. Utilizing PC technology, the present invention allows a user to enter hotel reservation information into a database and have a number of different documents sequentially generated and automatically transmitted to the various parties in the reservation transaction.

SUMMARY OF THE INVENTION

In accordance with the present invention, a method and system automate the generation and transmission of documents associated with the booking, confirming and payment of hotel reservations. A hotel reservation terminal receives a hotel reservation order from a travel agent and transmits information related to the traveler and the reservation to a transaction processor. The transaction processor automatically generates a series of transaction documents that may contain different verbiage and sequentially transmits these documents by facsimile to various entities involved in the reservation process. A written confirmation is transmitted by the transaction processor to the hotel for which the reservation is made. The bank through which payments are to be made is sent a pay order by the transaction processor to pay the hotel, the travel agent, and other parties in the transaction.

DESCRIPTION OF THE PREFERRED EMBODIMENT

Figure 1:
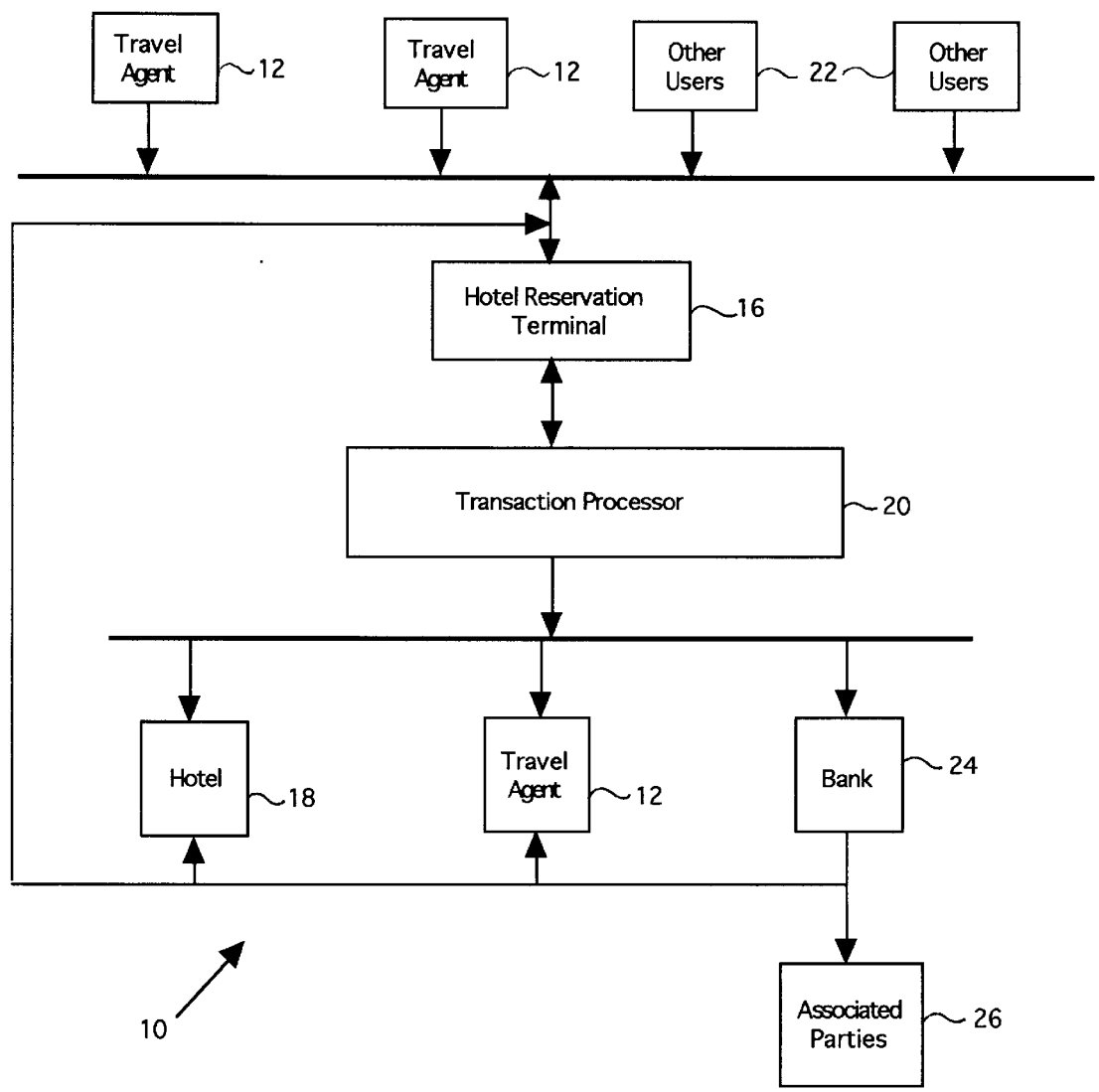
FIG. 1 is a block diagram showing the hotel reservation system of the present invention.

Referring now to FIG. 1, a block diagram is shown representing the hotel reservation system 10 of the present invention. Travel agents 12 contact system 10 by calling or electronically connecting with hotel reservation terminals 16. It should be noted for purposes of the description below that other users (such as travelers) 22 may also call hotel reservation terminal 16 directly, in certain applications of this system. Travel agents 12 generally operate by receiving commissions back from the travel reseller. Other users 22 would generally receive no such commission. Hotel reservation terminal 16 may be a personal computer or other terminal device which inputs and organizes user hotel reservation information. Typical information provided by travel agent 12 to hotel reservation terminal 16 includes the name of the travel agency and travel agent 12, the transaction type, the guest's name, an arrival date, departure date, city of reservation, hotel name, number of rooms, number of beds per room, room type, payment method, currency, credit card number, expiration date, and special requests.

Hotel reservation terminal 16 connects with transaction processor 20 and requests rooms for the travel agent 12, or other user 22. Hotel reservation terminal 16 displays a menu of selected hotels to travel agent 12 or travelers. To initiate a reservation request, the operator of the hotel reservation terminal 16 completes an order form displayed on hotel reservation terminal 16 and sends the information to transaction processor 20. Transaction processor 20 then accesses databases (described below with respect to FIG. 2) and notifies hotel reservation terminal 16 of the availability of the hotel rooms by generating a document back to the user. If the rooms are not available or are sold out, travel agent 12 or user 22 may select different dates or a different hotel. If the rooms are available and are accepted by travel agent 22, the appropriate databases are updated and transaction documents are then prepared by transaction processor 20. After receiving an acceptable reservation request from hotel reservation terminal 16, transaction processor 20 automatically generates a series of transaction documents and sequentially transmits these documents by facsimile to various entities involved in the reservation process. Initially, a reservation order is sent to hotel 18 instructing hotel 18 to reserve the rooms requested by travel agent 12. A written confirmation is then transmitted by transaction processor 20 to travel agent 12. Bank 24 is notified and instructed to make various payments for the reservation transactions including payments to hotel 18, travel agent 12, and other associated parties 26, including the hotel travel reseller.

Figure 2:
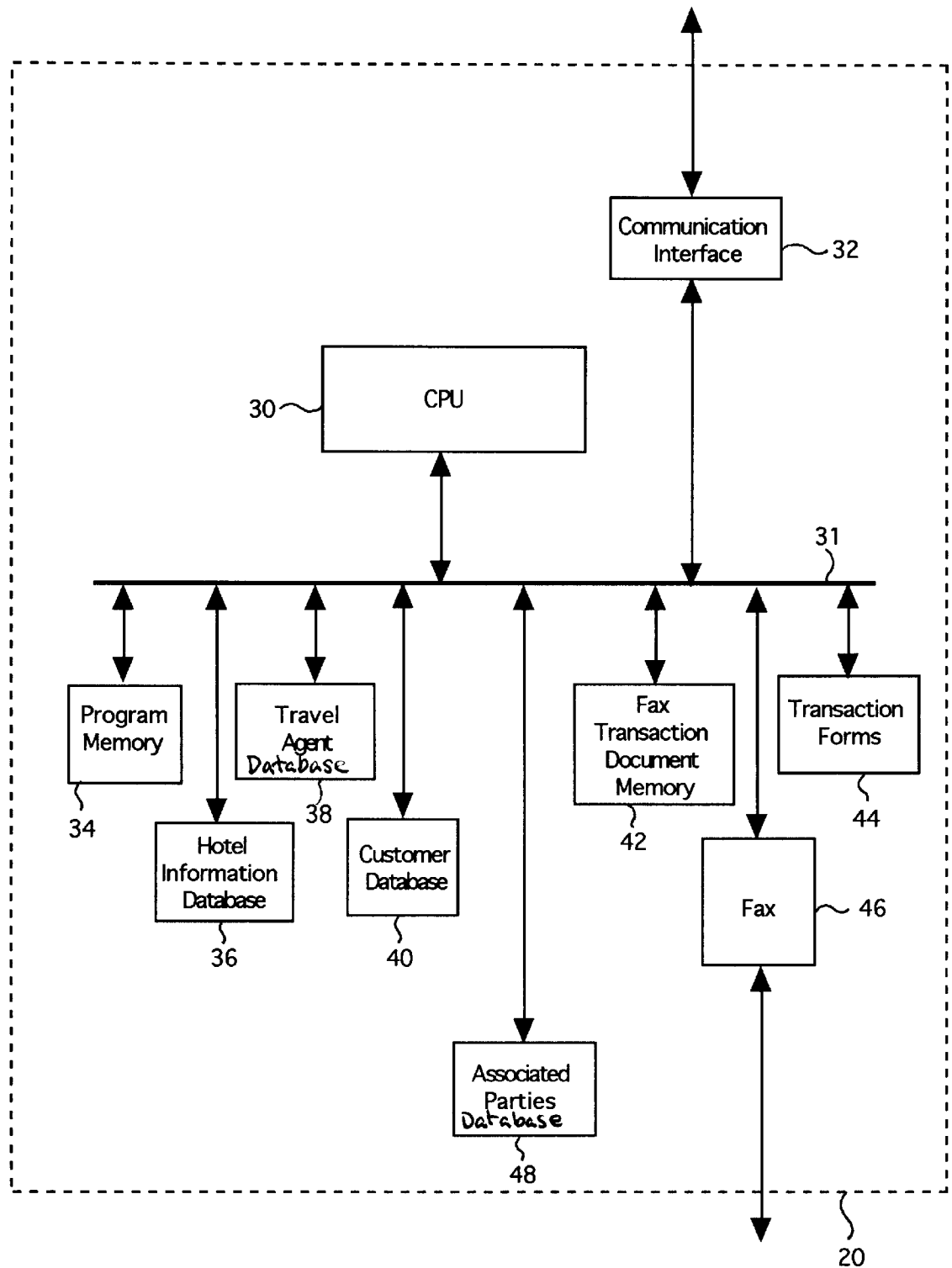
FIG. 2 is a block diagram showing the transaction processor of the hotel reservation system of FIG. 1.

Referring now to FIG. 2, a more detailed diagram of transaction processor 20 is shown. CPU 30 is illustrated connected to data bus 31, which in turn is connected to a series of memories, registers, and peripheral devices 34–46. CPU 30 is a conventional microprocessor of the type typically embodied on a single board, general purpose computer. In the preferred embodiment, transaction processor 20 is implemented using an Intel microprocessor-based personal computer. All memories are implemented using conventional memory devices and media as are normally found in a PC environment. Program memory 34 is connected to data bus 31 and is used to provide and store operating instructions for CPU 30. CPU 30 operates by sequentially addressing and implementing the steps in program memory 34. Hotel information database 36 contains stored hotel reservation information on all hotels which participate with the hotel reservation system 10. Such information includes the hotel name, the city of location, a hotel code, the number of rooms available, the room types available, the number of beds per room, nightly room rates, and information relating to the hotel's upgrade policy. Travel agent database 38 is connected to data bus 31 and stores information relating to travel agents who participate with the hotel reservation system 10. Such information includes an agent's account number, the agency name, the agent's name, the representative ID, the organizational ID, the representative's name, the organization's name, a partner ID, a partner name, discount and commission information, and the address and phone numbers of the agency.

Other key data stored in travel agent database 38 is the processor identity information, which relates to alternate processors and alternate processor ID's. An alternate processor, connected through communication interface 32, is a subscriber to the database information stored and processed by transaction processor 20. Using the processor identity information, alternate processors can offer the same hotels offered by transaction processor 20 to its travel agents 12, but with unique net and gross prices. For example, a tour wholesaler may wish to offer the Acme Hotel at $125 per night, while a second tour wholesaler (using an alternate processor) may offer the same hotel for $99 per night. This information is programmed into a separate memory space contained within hotel information database 36. CPU 30 reads the processor identity information stored in travel agent database 38 to determine whose customer the transaction relates to. Different hotel information databases are used for different alternate processors. Alternate processors are described more fully in connection with FIG. 4 below.

Customer database 40, also connected to data bus 31, stores reservation data received from hotel reservation terminal 16 by CPU 30. Fax transaction document memory 42 stores facsimile transaction documents which are generated by combining data stored in hotel information database 36, travel agent database 38, customer database 40, and associated parties database 48 for associated parties to the transaction, such as partners, representatives and organizations. Transaction forms memory 44 contains a set of pre-configured forms which are used by CPU 30 in producing the fax transaction documents stored in memory 42. The fax transaction documents include discreet, unique documents which are individually communicated to various parties and which provide confirmation and instructions related to the hotel reservation process of each individual customer. In a typical transaction, CPU 30 combines information from hotel information database 36, travel agent database 38, customer database 40, and associated parties database 48, in a form generated from transaction forms memory 44. This combined information is used to prepare hotel reservation documents, which are then transmitted via fax 46 to the reserved hotel 18. Subsequently, CPU 30 prepares a separate document to travel agent 12 confirming the reservation. CPU 30 also generates and sends via fax 46 an order instructing bank 24 to pay hotel 18 for reservations used, and to pay a commission to the travel agent 12 who booked the reservation through hotel reservation terminal 16. In addition, the operator of hotel reservation terminal 16 also receives payment from bank 24 as instructed by CPU 30. Any other third parties associated with the transaction can also receive transmitted copies of individually prepared documents using the sequential transaction system.

In the preferred embodiment, transaction processor 20 receives and automatically processes information from hotel reservation terminal 16. Once travel agent 12 has received the hotel accommodations transaction information from hotel reservation terminal 16, CPU 30 stores the information in customer database 40. Executing instructions stored in program memory 34, CPU 30 begins generating transaction records to be stored in fax transaction document memory 42. CPU 30 first generates a hotel confirmation record by retrieving a confirmation form from transaction forms memory 44 and storing the format information in fax transaction document memory 42. Hotel information relating to the name, address, phone number, type of room, and rate is transferred from hotel information database 36 to fax transaction document memory 42, according to the format previously retrieved from transaction forms memory 44. User reservation information such as name, address, method of payment, telephone number, credit number and the like are then retrieved from customer database 40 and stored using the appropriate format in fax transaction document memory 42. In a similar manner, information related to the travel agent 12 is retrieved from travel agent database 38 and compiled into the document being generated in fax document memory 42. Once the confirmation document is completed, CPU 30 transfers the document across data bus 31 onto fax 46, for transmittal to hotel 18. Using a similar process, CPU 30 generates corresponding documents for transmission to travel agent 12, to bank 24 for payment, and to other associated parties 26 who have an interest in the reservation transaction such as partners, representatives, organizations, and the travel reseller. The entire process of generating and transmitting documents is performed automatically in a matter of a few minutes.

Figure 3:
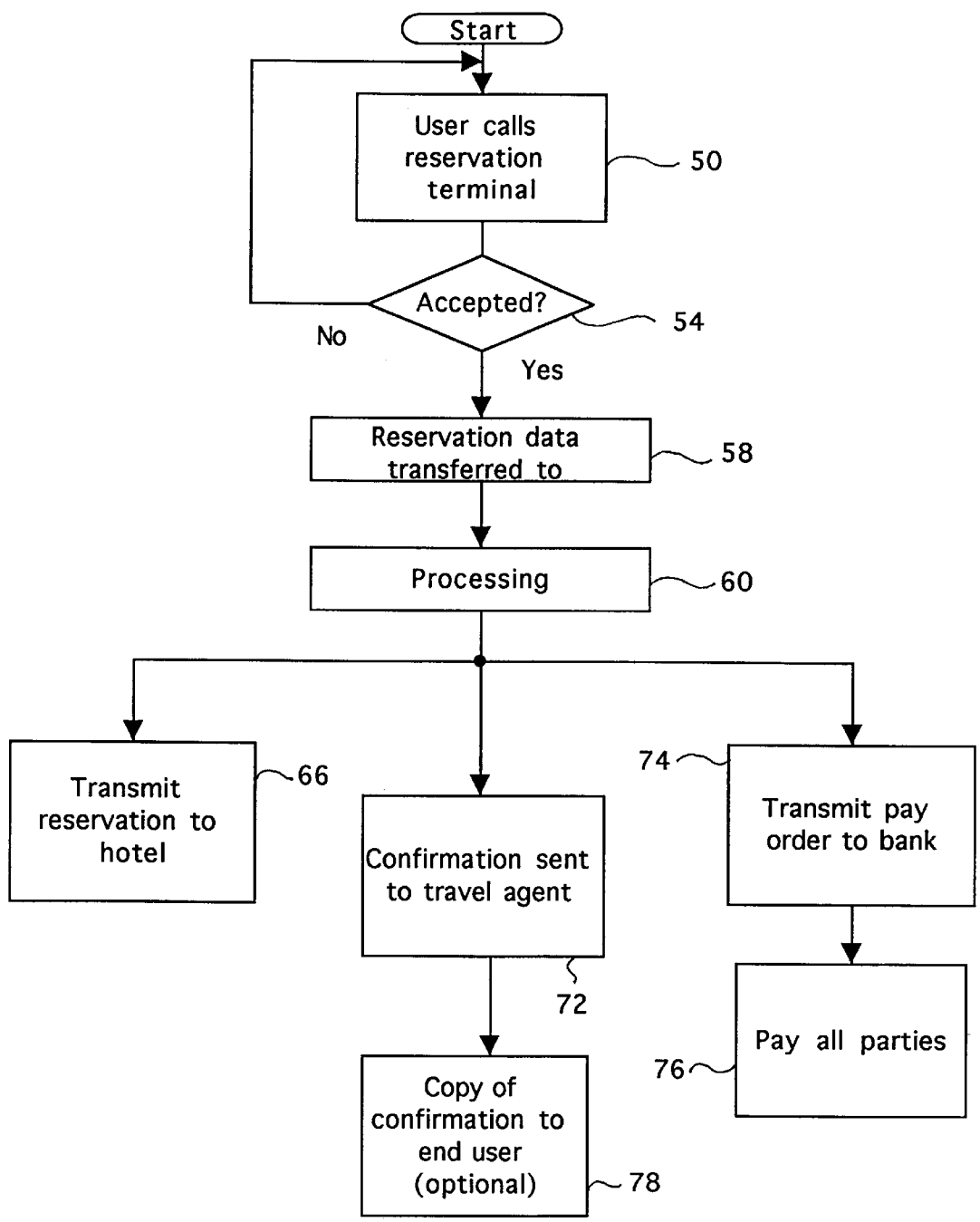
FIG. 3 is a flow diagram showing the method steps of the present invention.

Referring now to FIG. 3, a method is shown for describing the operation of the hotel reservation system 10. In step 50, a travel agent 12 or other user 22 initiates a reservation request by viewing the options presented on a computer screen of hotel reservation terminal 16. Hotel reservation terminal 16 connects with transaction processor 20 and requests rooms for travel agent 12. CPU 30 of transaction processor 20 accesses and queries hotel information database 36 regarding room availability on the dates requested and then conveys the information to hotel reservation terminal 16. If the rooms are available, the appropriate databases are updated and transaction documents are then prepared in step 60 by transaction processor 20. If the rooms are not available, the transaction processor 20 will generate a document notifying the initiator of the request that the rooms are not available.

The reservation request is transferred to transaction processor 20 in step 58. Next in step 60, transaction processor 20 uses information stored in hotel information database 36 and travel agent database 38, to generate fax transaction documents for storage in fax transaction document memory 42, as described above with respect to FIG. 2. Transaction processor 20 then transmits 66 a hotel reservation to hotel 18. The transaction processor 20 next sends 72 confirmation to travel agent 12 and then optionally transmits 78 a confirmation of the hotel reservation to other user 22. In addition, transaction processor 20 transmits 74 an order to its bank 24 to make payments to hotel 18 and travel agent commission, if appropriate, to travel agent 12. Bank 24 will pay 76 fees to the hotel reservation terminal 16 as well as other parties associated with the transaction 26, such as partners, representatives and organizations.

Figure 4:
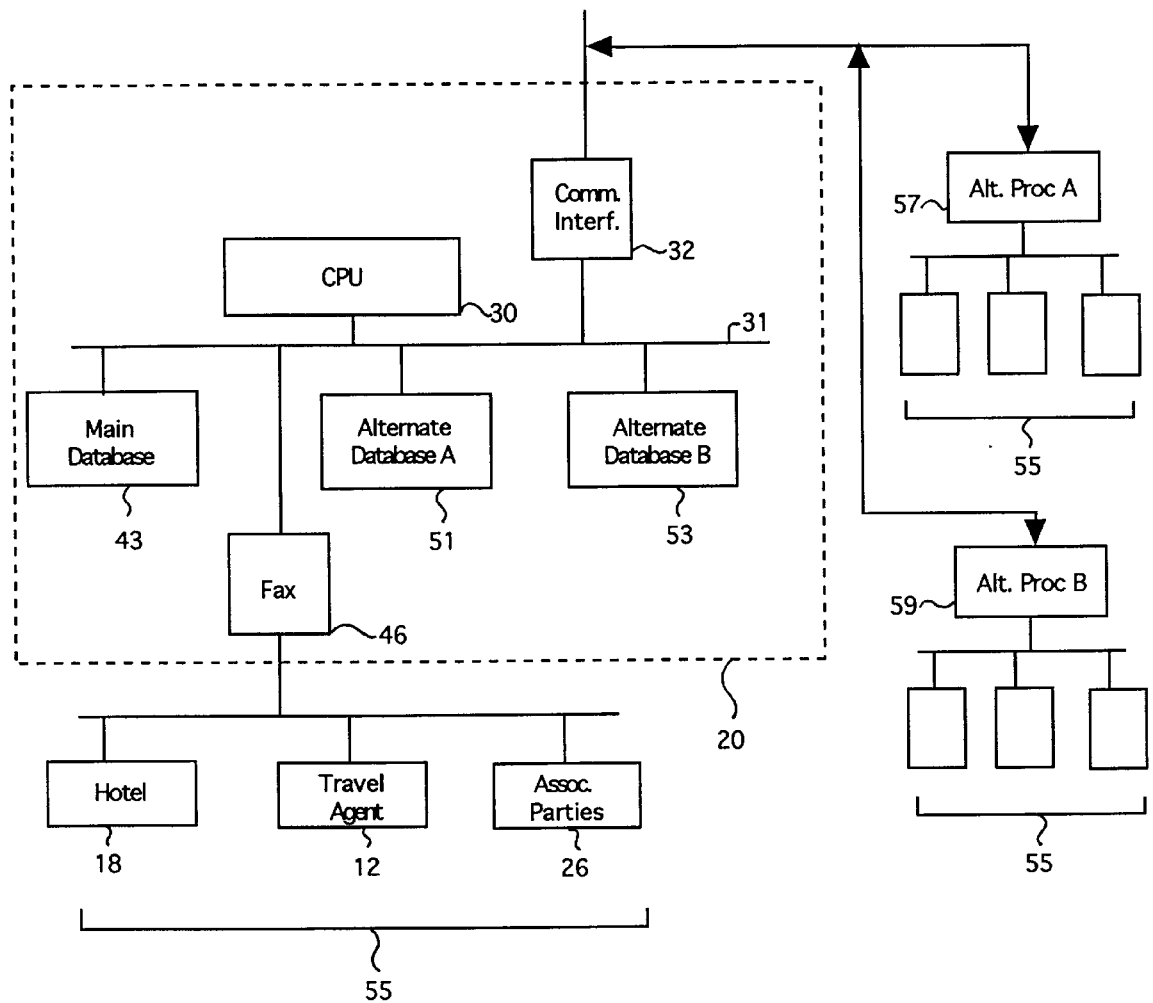
FIG. 4 is a block diagram showing an alternative embodiment of the transaction system of FIG. 1 containing alternate processors.

Referring now to FIG. 4, an alternative embodiment of the reservation system in the present invention is shown in which alternative processors 57,59, utilizing different databases within transaction processor 20, share database and processing resources with transaction processor 20. In this embodiment, transaction processor 20 receives reservations from travel agents 12 as described above, in reference to FIG. 1. CPU 30 then generates reservation transaction documents utilizing data records stored in main database 43. These records of main database 43 correspond to records contained in hotel information database 36, user database 38, customer database 40, and associated parties database 48 of FIG. 2. Once the reservation documents have been generated, the documents are transmitted via facsimile to hotel 18, travel agent 12 and associated parties 26 to the reservation transaction. Each of the parties 18, 12, and 26 are denoted collectively as transaction parties 55.

In this alternative embodiment, the primary reservation system which is controlled by the main processor, identified in FIG. 4 as transaction processor 20, shares its database resources with alternative processors 57,59. As discussed above, an alternative processor works in conjunction with a main processor for the purpose of receiving hotel reservation requests and generating reservation transaction documents. In application, the user of an alternate processor would be a subscriber or licensee of the main processor. The main processor is owned and operated by a travel reseller which collects and stores hotel pricing and other database information. The main processor may, for its own account, provide reservation services for travel agents and other authorized users 22 as described with reference to FIG. 1 and FIG. 2. In addition to servicing travel agents and users, transaction processor 20 also provides access to its stored database information to subscribing alternate processors 57,59. The alternate processors 57,59 are typically remotely located companies that advertise and receive travel agent reservation requests separate from those processed by transaction processor 20.

Upon receiving travel agent 12 or user 22 requests, the alternate processors 57,59 access alternate databases 51,53 maintained by transaction processor 20. The information stored in the alternate databases 51,53 is similar to the information maintained in the main database 43, except that the pricing structures, and products and services may be different to reflect different rate structures negotiated by the alternate users. In addition, the alternate databases 51,53 may contain unique travel and client information as well as transaction forms which are unique to the alternate processors 57,59. Once the information is retrieved by the alternate processor 57,59 from the alternate database 51,53, the alternate processor 57,59 generates transaction documents which it then transmits via facsimile to its own set of parties 55. These parties include the hotel with which the reservation is booked, the bank through which payment to the hotel and others is processed, and the travel agent or user who originally placed the reservation.

Focusing on alternate processor 57, with the understanding that any number of processors can be similarly operated, communication is made with transaction processor 20 through communication interface 32. Alternate processor 57 communicates its processor identity to travel agent database 38 which identifies the alternate processor as a bona fide subscriber. Once proper identification is made, CPU 30 enables hotel data base 51 to release data to alternate processor 57. Alternate processor 57 contains pricing and availability information unique to this alternate processor. Alternate processor 57 extracts data from alternate database 51 and locally generates its own individual transaction documents as described above. These transaction documents are then sequentially transmitted by alternate processor 57 to its various parties 55, including the relevant hotel, travel agent, bank, etc.

The invention has now been explained with reference to specific embodiments. Other embodiments will be apparent to those of ordinary skill in the art in light of this disclosure. Therefore it is not intended that this invention be limited, except as indicated by the appended claims.

What is claimed is:

1. A computer-based hotel reservation system for generating transaction documents and transmitting the documents to each party involved in the transaction comprising:

hotel information memory containing hotel rate and room availability for at least one hotel;

travel agent memory containing data identifying a travel agent using the hotel reservation system;

customer memory containing data identifying a customer and preferred dates of travel;

a transaction document processor for retrieving data stored in each of said memories and for generating a set of reservation documents comprising a hotel document set and a customer document set; and communication means for transmitting the hotel document set to the hotel and the customer document set to the customer.

2. The hotel reservation system according to claim 1, wherein the set of reservation documents further comprises a third party document set for transmission to a third party.

3. The hotel reservation system according to claim 2, wherein the third party is a banking agent.

4. The hotel reservation system according to claim 3, wherein the third party set contains instructions authorizing payment of said travel agent.

5. The hotel reservation system according to claim 1, wherein the communication means is a facsimile machine.

6. The hotel reservation system according to claim 1, wherein communication means transmits the reservation documents sequentially.

7. A computer-based hotel reservation system for generating and processing transaction documents for hotel reservations comprising:

a main processor comprising:

(i) main data base memory containing information related to a main hotel reservation rate structure;

(ii) a main transaction document processor for generating a set of reservation documents based on the main hotel reservation rate structure;

(iii) alternate data base memory containing information related to an alternate hotel reservation rate structure; and (iv) a communication interface coupled to the alternate data base memory for enabling access to the alternate data base memory; and an alternate processor coupled to the communication interface for retrieving information from the alternate data base memory and generating an alternate set of reservation documents based on the alternate hotel reservation rate structure.

8. The hotel reservation system according to claim 7, wherein the main processor is maintained by a travel reseller.

9. The hotel reservation system according to claim 8, wherein the main processor transacts reservations for the travel reseller.

10. The hotel reservation system according to claim 7, wherein the main data base memory is accessible only by the main processor.

11. The hotel reservation system according to claim 7, wherein the alternate data base memory is accessible only by the alternate processor.

12. The hotel reservation system according to claim 7, wherein the alternate processor is remotely located from the main processor.

13. A computer-based method for generating hotel reservation transactions comprising the steps of receiving a customer request from a travel agent for a hotel reservation;

searching a hotel information data base for information related to the hotel reservation, the data base comprising hotel address, room availability, and room rate information;

generating a set of transaction documents responsive to the search of the hotel information data base, the set of transaction documents comprising a confirmation document addressed to the travel agent verifying the hotel reservation and a confirmation document addressed to the hotel verifying the hotel reservation; and sequentially transmitting each document of the set of transaction documents to the individual addressed parties.

14. The method according to claim 13, further comprising the steps of:

generating a payment request document addressed to a banking institution ordering the payment of a commission to the travel agent; and transmitting the payment request document to the banking institution sequentially with each document of the set of said transaction documents.

15. A computer-based method for generating hotel reservation transactions comprising the steps of storing a main hotel reservation rate structure in a main data base and an alternate hotel reservation rate structure in an alternate data base;

receiving a customer request for a hotel reservation;

searching the alternate data base for information related to the alternate hotel reservation rate structure, the data base comprising hotel address, room availability, and alternate room rate information;

generating a set of transaction documents responsive to the search of the alternate hotel information data base, the set of transaction documents comprising a confirmation document addressed to the customer verifying the hotel reservation and a confirmation document addressed to the hotel verifying the hotel reservation; and sequentially transmitting each document of the set of transaction documents to the individual addressed parties.

16. A computer-based method for generating hotel reservation transactions comprising the steps of:

receiving a customer request for a hotel reservation in a first computer system;

searching a hotel information data base in a second computer system for information related to the hotel reservation, the data base comprising hotel address, room availability, and room rate information;

transmitting search results from the hotel information data base in the second computer to the first computer;

generating a set of transaction documents in the first computer responsive to the transmitted search results, the set of transaction documents comprising a confirmation document addressed to the travel agent verifying the hotel reservation and a confirmation document addressed to the hotel verifying the hotel reservation; and sequentially transmitting each document of the set of transaction documents to the individual addressed parties.

* * * * *